No. 852,980. PATENTED MAY 7, 1907.
J. A. RISHEL.
TRACK SCALE.
APPLICATION FILED AUG. 29, 1903.
3 SHEETS—SHEET 1.
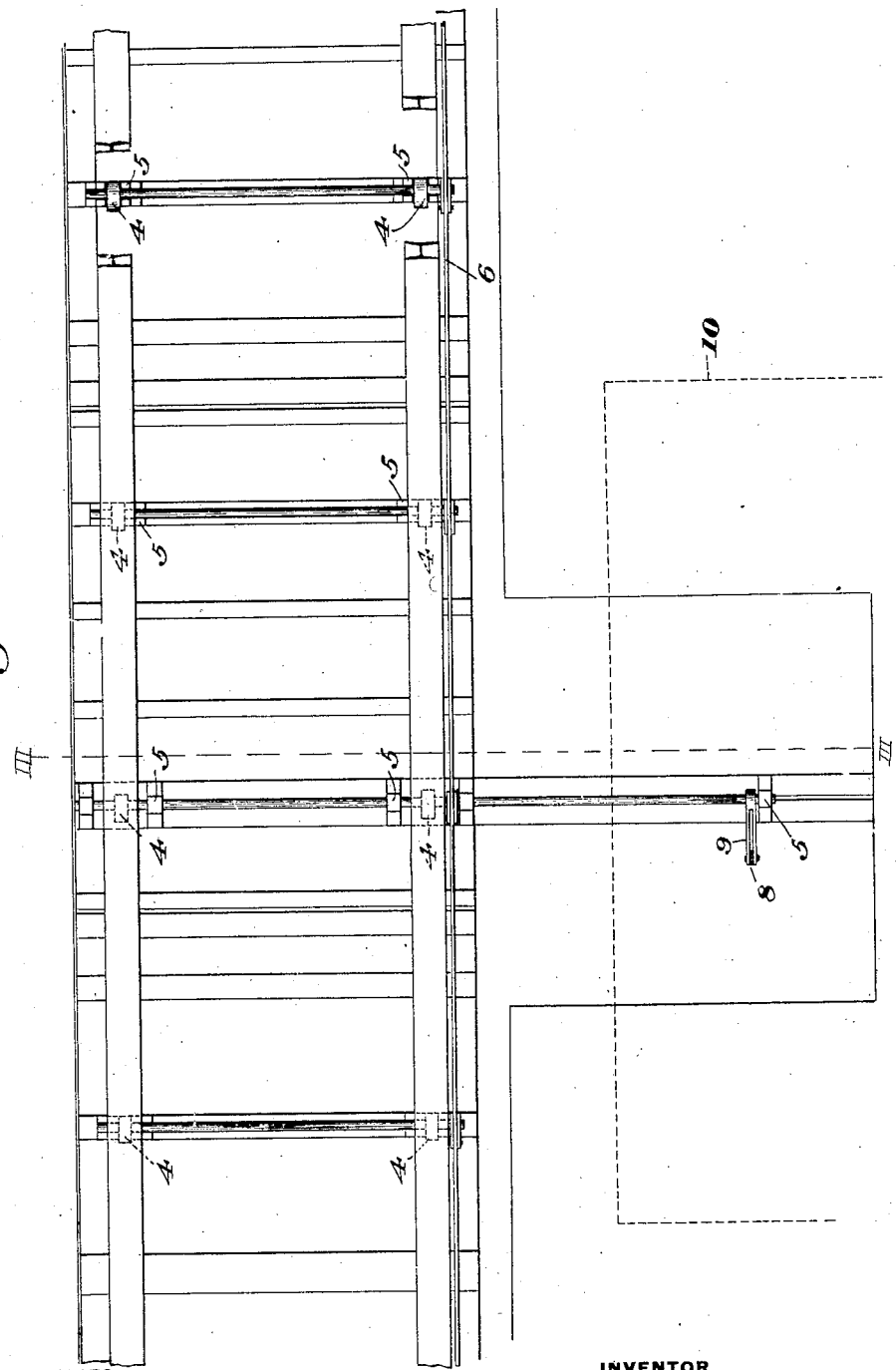
WITNESSES
INVENTOR

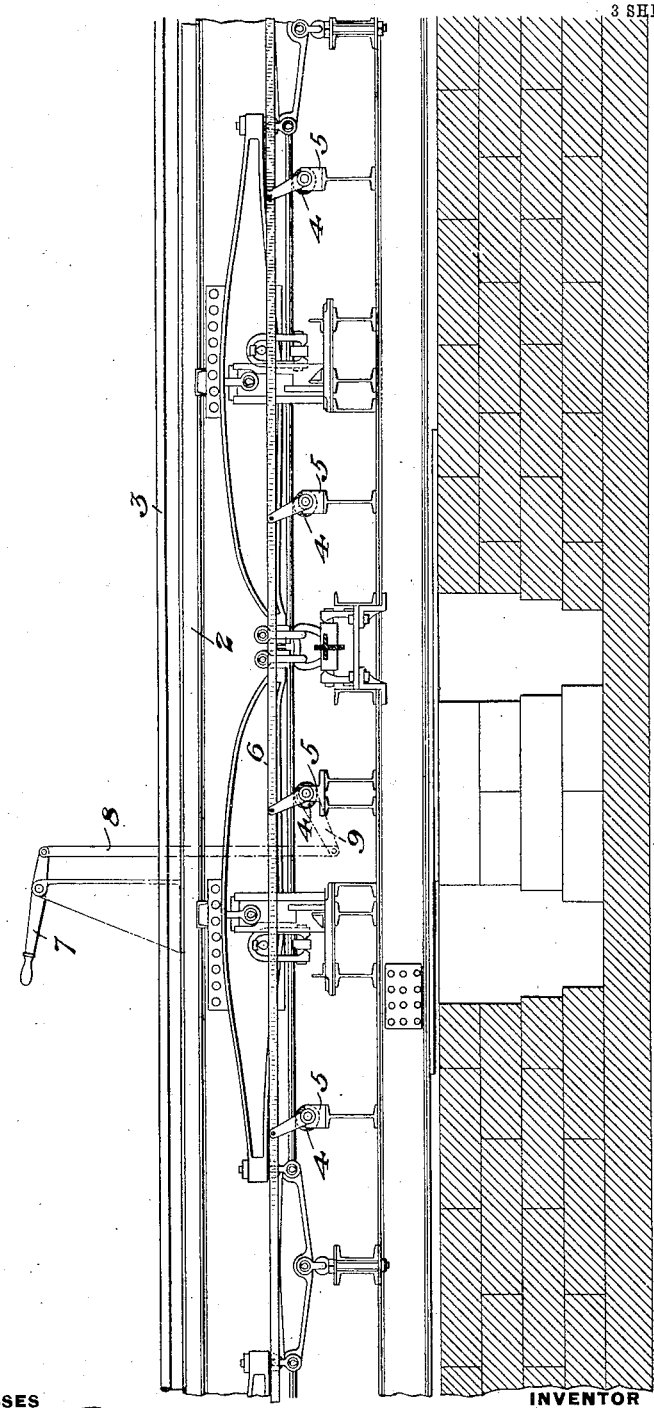

No. 852,980. PATENTED MAY 7, 1907.
J. A. RISHEL.
TRACK SCALE.
APPLICATION FILED AUG. 29, 1903.
3 SHEETS—SHEET 3.
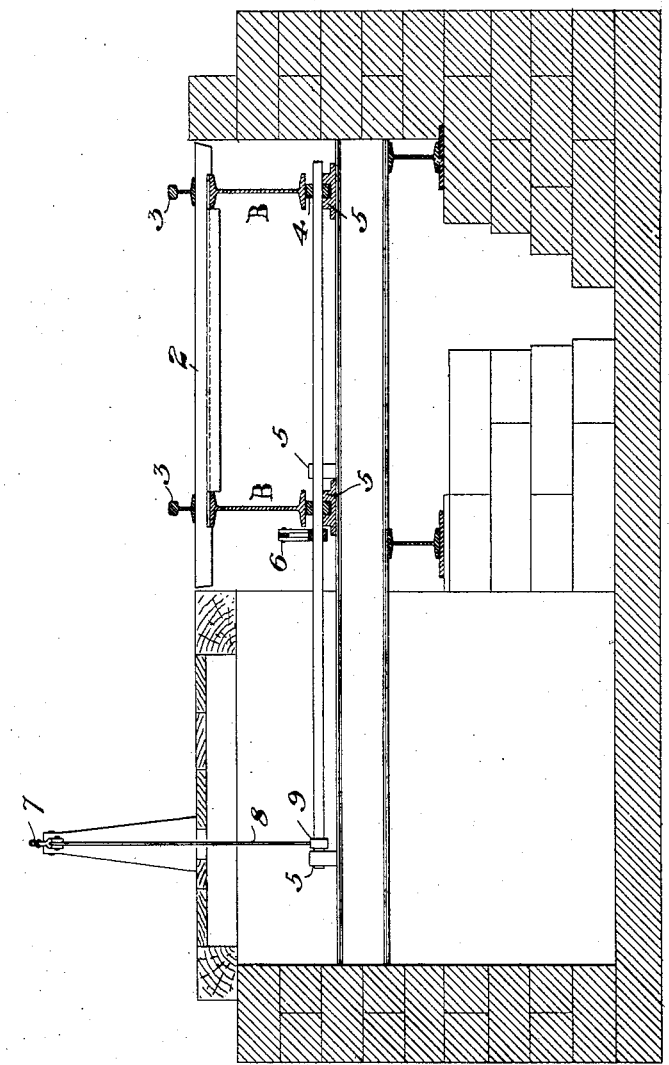
WITNESSES
INVENTOR
John A. Rishel

UNITED STATES PATENT OFFICE.

JOHN A. RISHEL, OF HOMESTEAD, PENNSYLVANIA.

TRACK-SCALE.

No. 852,980.  Specification of Letters Patent.  Patented May 7, 1907.

Application filed August 29, 1903. Serial No. 171,191.

*To all whom it may concern:*

Be it known that I, JOHN A. RISHEL, of Homestead, Allegheny county, Pennsylvania, have invented a new and useful Track-Scale, of which the following is a full, clear, and exact description, reference being had to the accompanying drawings, forming part of this specification, in which—

Figure 1 is a plan view of my improved device; Fig. 2 is a side elevation, and Fig. 3 a vertical cross-section on the line III—III of Fig. 1.

Heretofore in the construction of railway track scales it has been the practice to employ two sets of rails, one set mounted directly on the platform of the scales and adapted to receive the cars during the weighing operation and the other set—known as the dead rails—mounted on posts or supports independent of the platform and adapted for the passage of the cars when the scales are not used for weighing. The difficulty in this arrangement has been that it requires switches for switching the cars to and from the platform track, and that when trainmen carelessly fail to set the switch the trains pass over the platform track when the scales are not in use, thereby jarring and injuring the scale-mechanism. My invention prevents these difficulties and provides means by which the dead rails can be dispensed with and a single set of rails employed on which the cars rest during the weighing operation, and over which they can be passed with safety when the scales are not in use.

I provide the platform of the scales with a supporting device which can be raised when the scales are not in use, and whether a car is standing on the platform or not, so as to support the platform and relieve its weight from the scale beams. When the platform is thus supported trains can pass over it without transmitting pressure to the scale beams and bearings. The mechanism by which this support is operated is preferably extended into the office of the weigh-master so that it cannot be tampered with and the scales improperly put out of their supported condition.

In the drawing, which shows the preferred form of my apparatus, 2 represents the platform of the scale on which are set the track rails 3, 3. This platform is connected to the scale beams B in the ordinary way. Beneath it is a series of eccentrics 4, 4, journaled in bearings on fixed supports 5, 5 and connected by a rod 6 so that they will operate together. They are operated by lever 7 connected by a rod 8 or other mechanism to an operating lever 9 which is located in the office of the weigh-master, the dotted lines 10 in Fig. 1 representing the office building.

When the scale is to be brought into weighing position, the eccentrics 4 are turned by operation of the lever 9 so as to bring their surfaces below the platform and to permit the platform to be supported by the scale beams as shown in Fig. 2. For this purpose the greatest radius of each eccentric is such that when it is brought into operative position it will make contact with and support the platform without lifting it. I am thus enabled to bring the eccentrics into action without need of lifting the platform and therefore with very little exertion on the part of the operator and without the use of complicated mechanical connections for operating the eccentrics.

The cars to be weighed can then be drawn upon the scales, and when the weighing is finished and the scales are to be put out of action, the eccentrics are moved in the reverse direction by operation of the lever 9 so as to bring them into supporting contact with the bottom of the platform. The platform is then supported by the eccentrics and cars and heavy locomotives can be drawn over it without operating the scales or causing injury to the scale mechanism. I am thus enabled to interpose a scale platform directly in the line of the railway track without the employment of switches and to operate the scales without requiring the attention of the trainmen to put them into or out of action.

Instead of eccentrics other equivalent mechanism may be used for supporting the platform, since

What I claim is—

A support for track-scale platforms consisting of a series of rotatable eccentrics arranged beneath the platform and adapted to support without raising said platform when the points of greatest throw of said eccentrics are vertically above their centers of rotation, and means for rotating said eccentrics; substantially as described.

In testimony whereof, I have hereunto set my hand.

JOHN A. RISHEL.

Witnesses:
 GEO. B. BLEMING,
 L. A. CONNER, Jr.